United States Patent [19]
Aiuola

[11] B  3,990,569
[45]  Nov. 9, 1976

[54] APPARATUS FOR ARRANGING, AT A PREDETERMINED SPACING ON A RECEPTION CONVEYOR, OBJECTS ORIGINATING IN A DISORDERED MANNER FROM A DELIVERY CONVEYOR

[75] Inventor: Franco Aiuola, Bologna, Italy

[73] Assignee: Azionaria Costruzioni Macchine Automatiche A.C.M.A. S.p.A., Bologna, Italy

[22] Filed: Dec. 14, 1973

[21] Appl. No.: 424,989

[44] Published under the second Trial Voluntary Protest Program on February 3, 1976 as document No. B 424,989.

[30] Foreign Application Priority Data
Dec. 18, 1972  Italy .................................. 3619/72

[52] U.S. Cl. ............................ 198/461; 214/1 BA; 198/577; 198/610
[51] Int. Cl.² ........................................ B65G 15/00
[58] Field of Search ............... 198/179, 69, 25, 209, 198/210, 237, 239, 241; 214/1 BH, 1 BA

[56]  References Cited
UNITED STATES PATENTS

| | | | |
|---|---|---|---|
| 3,300,063 | 1/1967 | Jensen et al. ....................... | 198/179 |
| 3,302,803 | 2/1967 | Mooney ........................... | 214/1 BA |

Primary Examiner—James B. Marbert
Attorney, Agent, or Firm—Laurence A. Savage

[57]  ABSTRACT

An apparatus and method for arranging, at a predetermined spacing on a reception conveyor, objects originating in an unevenly spaced manner from a delivery conveyor. The delivery conveyor is driven with continuous motion. The reception conveyor is driven with intermittent motion. The apparatus comprises a flexible closed loop member lying in a horizontal plane. A first portion of the flexible loop extends parallel to the end part of the delivery conveyor and a second portion extends parallel to the initial part of the reception conveyor. A series of suckers is distributed along the flexible member and mobile vertically by means of cams disposed along the first and second portions for causing the suckers to move close to and away from the delivery and reception conveyors. A distributor member is arranged to connect and disconnect the suckers cyclically to and from suction means for taking the objects from the delivery conveyor and depositing them respectively on the reception conveyor. The speed of the flexible member is constant and different from that of the delivery conveyor. The reception conveyor stroke is arranged to attain a speed equal and concordant with that of the flexible member during the intermittent advancement.

8 Claims, 8 Drawing Figures

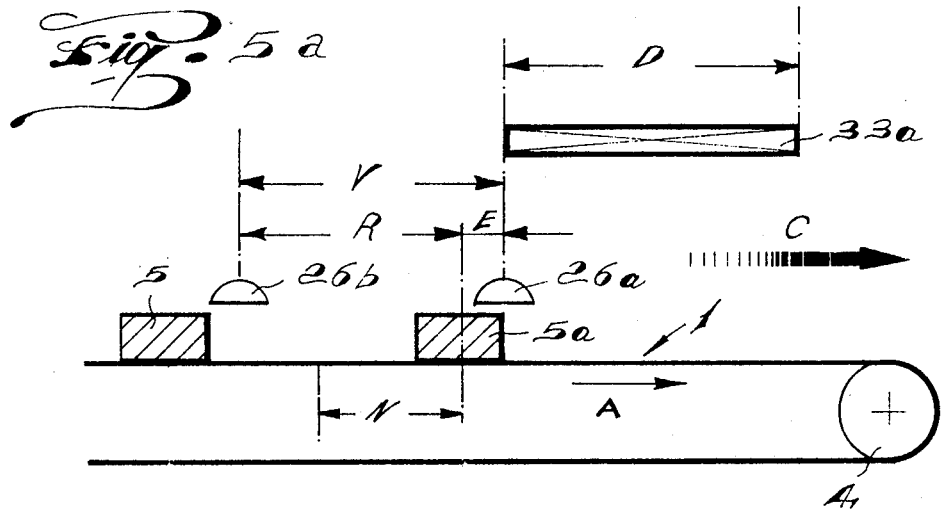
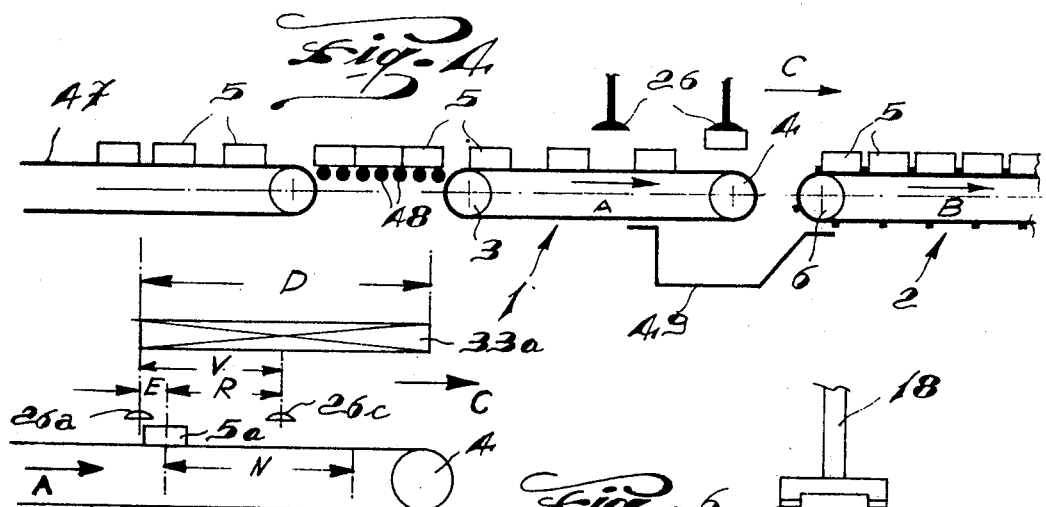
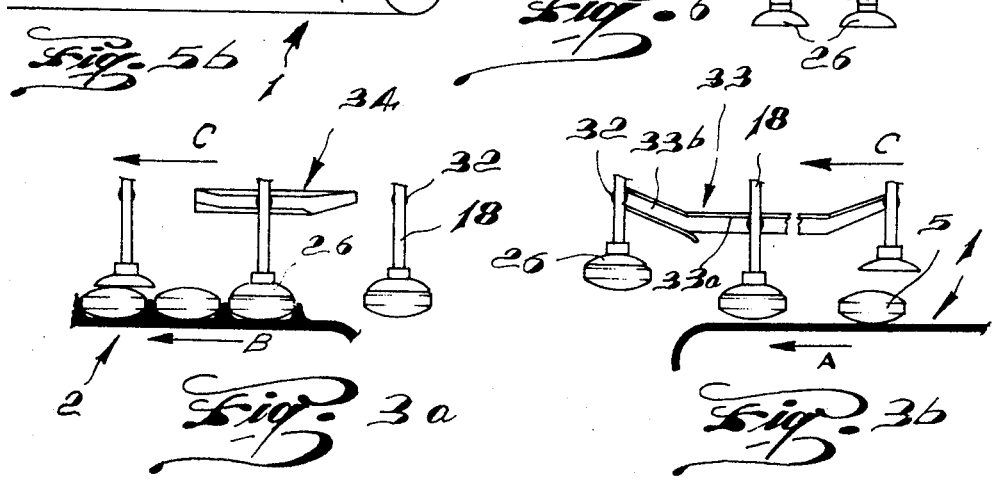

APPARATUS FOR ARRANGING, AT A PREDETERMINED SPACING ON A RECEPTION CONVEYOR, OBJECTS ORIGINATING IN A DISORDERED MANNER FROM A DELIVERY CONVEYOR

BACKGROUND OF THE INVENTION

This invention relates to an apparatus for arranging, at a predetermined spacing on a reception conveyor, objects originating in a disordered manner from a delivery conveyor.

This technical problem is strongly felt where it is required to feed packaging machines with objects of delicate nature (for example soaps) which are difficult to manipulate without undergoing damage if they are to be introduced into the packaging machines at a constant rate.

In fact the automatic devices which are known and used at the present time for arranging objects at a given spacing are not acceptable when the objects are of a delicate nature, because they use members which operate mechanically on the objects and which cause them to slide on the conveyor belts.

It must also be noted that devices of known type are considerably complicated because of the fact that usually they have to coordinate the action of said members with the detection by appropriate sensing devices that the object on which they have to act has arrived in a position suitable for the operation.

SUMMARY OF THE INVENTION

The object of this invention is therefore to provide an apparatus able to operate on objects, even where these are of a delicate nature, without them undergoing damage and in such a manner that the objects may be fed to the packaging machines at a predetermined spacing.

The apparatus according to the invention is characterised in that the delivery conveyor is driven with continuous motion whereas the reception conveyor is driven with intermittent motion, and comprises a flexible closed loop member lying in a horizontal plane, of which a first portion extends parallel to the end part of the delivery conveyor and a second portion extends parallel to the initial part of the reception conveyor, a series of suckers distributed along said flexible member and mobile vertically by means of cams disposed along said first and second portions for causing the suckers to move close to and away from the delivery and reception conveyors, and a distributor member arranged to connect and disconnect the suckers cyclically to and from suction means for taking unevenly spaced the objects from the delivery conveyor and depositing them respectively on the reception conveyor, the speed of said flexible member being constant and different from that of the delivery conveyor, and the reception conveyor during the intermittent advancement stroke being arranged to attain a speed equal and concordant with that of the flexible member.

The foregoing and other objects, features and advantages of the present invention will become more apparent in light of the following detailed description of a preferred embodiment thereof, as illustrated in the accompanying drawings.

BRIEF DESCRIPTION OF THE DRAWINGS

Further characteristics of the apparatus according to the invention will be more evident from the description given hereinafter of a preferred embodiment, illustrated by way of example in the accompanying drawings, in which:

FIGS. 3a and 3b are elevational views of the stages relating to the taking of the objects from the delivery conveyor and their respective release on to the reception conveyor;

FIG. 4 shows the longitudinal development in one plane of the apparatus and feed unit;

FIGS. 5a and 5b are schematic representations which illustrate the conditions for the operation of the apparatus;

FIG. 6 is an elevational view of a sucker according to a modification.

DESCRIPTION OF THE PREFERRED EMBODIMENT

Figure 1:
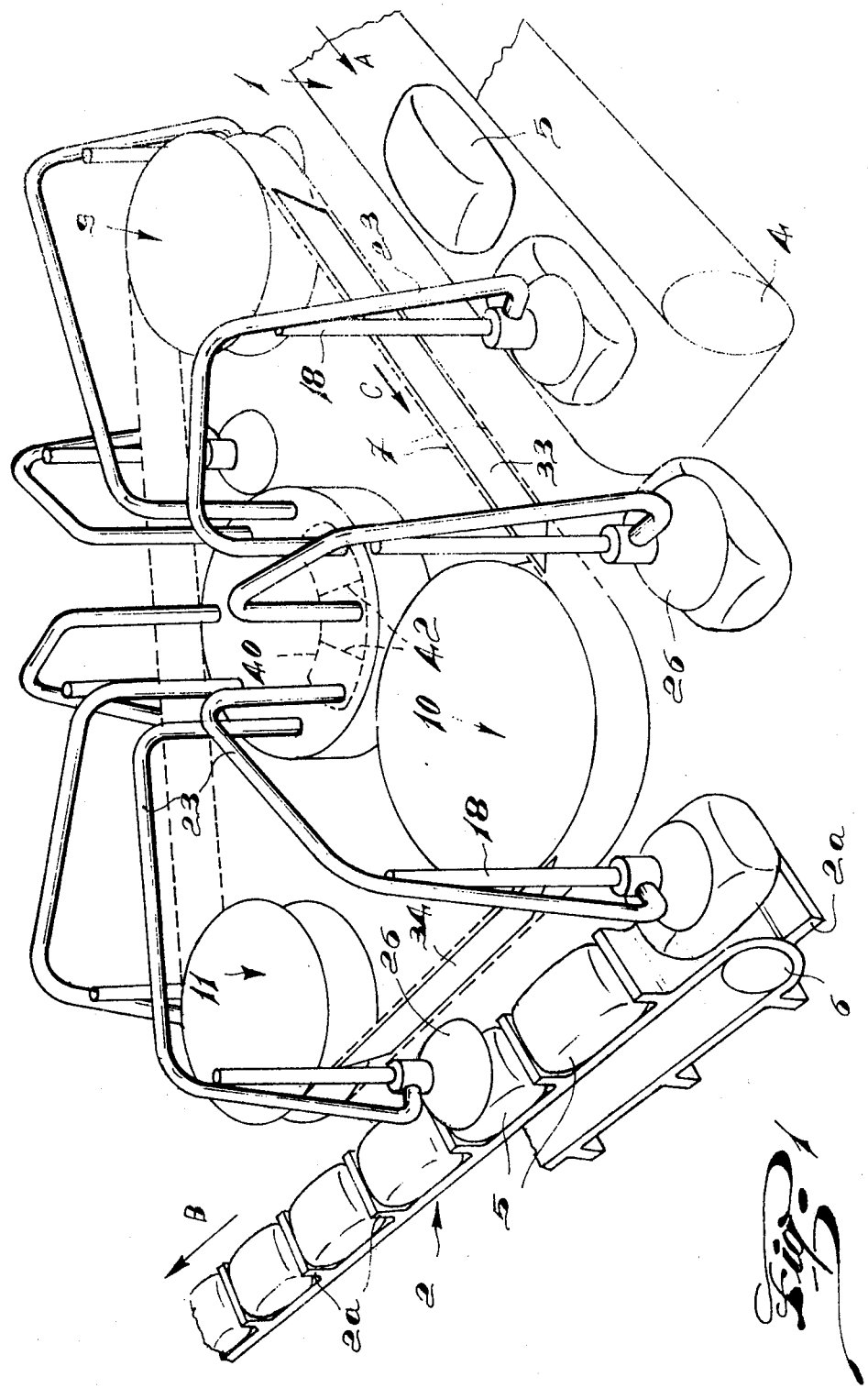
FIG. 1 is a schematic perspective view of the apparatus according to the invention.

The figures show a delivery conveyor 1 and a reception conveyor 2 for objects, for example soaps which have not completely hardened and which arrive from the press. In this case the reception conveyor may for example be the feed conveyor of a packaging machine. The delivery conveyor 1 consists of a smooth belt, closed in the form of a loop and winding around rollers 3 and 4 of horizontal axis. Whereas one of the rollers is idle, the other roller is driven with continuous rotary motion, in such a manner that the upper branch of the belt moves in the direction indicated by the arrow A at constant speed. The reception conveyor 2 consists of a belt closed in the form of a loop and comprising, on its outside, transverse projections 2a distributed at equal distances. Each pair of projections thus defines a seat or compartment able to receive a respective object 5. The belt 2 is wound in the form of a closed loop around a drive roller and an idle rollers respectively, of which only this latter is shown in the figures and is indicated by the reference numeral 6. The belt 2 extends in a direction perpendicular to that of the belt 1, with its upper portion moving in the direction indicated by the arrow B. The belt 2 is driven with intermittent motion of a pitch equal to the distance between two successive compartments, so that in the interval between two halts of the belt, it attains and maintains for a certain period of time a speed of advancement nearly constant and equal to the speed of a flexible member consisting of the pair of chains 7.

Figure 2:
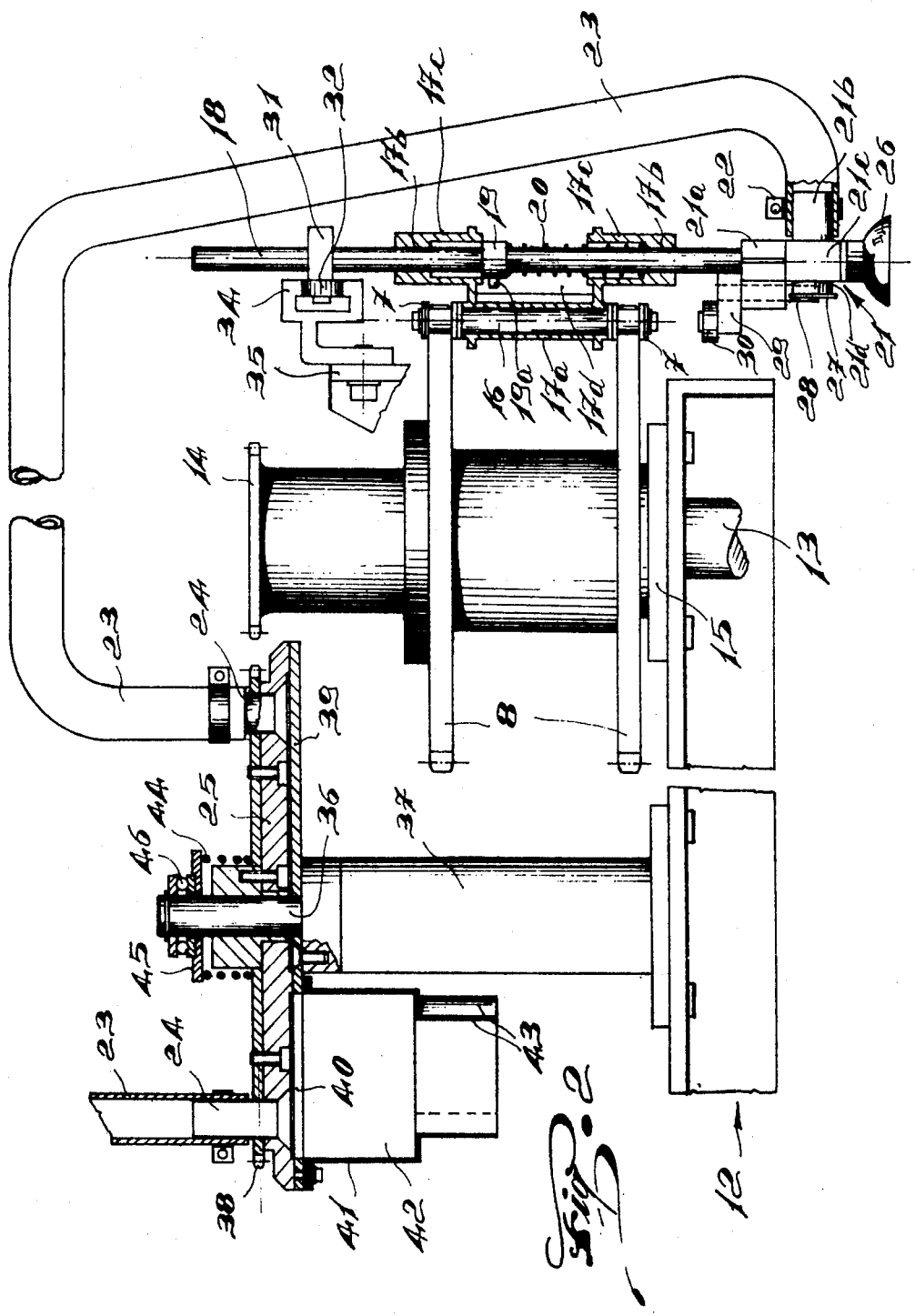
FIG. 2 is a vertical section through the apparatus.

The chains 7 wind around the gearwheels 8 of three rotating assemblies 9, 10 and 11 of vertical axes and disposed at the vertices of a right angled triangle so that the chains 7 have portions parallel to the belts 1 and 2. Two of the said rotating assemblies are supported idly by the frame 12 of the apparatus; the third rotating assembly (see FIG. 2) is supported by the upper part of a vertical shaft 13, to the summit of which is fixed the sprocket 14, to which reference will be made hereinafter. The shaft 13 is rotatably mounted by way of bearings in a sleeve 15 fixed to the frame 12, and is driven with continuous rotary motion by the drive unit of the apparatus.

The two chains 7 are connected together at their vertically aligned hinge points by pins (FIG. 2) distributed in steps along the chains. On each of the pins 16 is disposed the sleeve 17a, provided with two projections 17c in which are formed respective through seats 17b which are aligned vertically. The rod 18 is slidably inserted into the pair of seats and a ring 18 is positionable and clampable at about the middle of its height. An appendix 19a of the ring is slidably guided in a vertical slot 17d which is formed in a wall which connects the projections 17c of the seats 17b. In this manner the rod is prevented from rotating. The rod 18 is then returned upwards by a spring 20 interposed between the lower projection 17c and the ring 19.

At the lower end of the rod 18, a clamp 21a clamps a connection piece 21 of T shape. A horizontal branch or tubular part 21b of the connection piece 21 is inserted into the end of a flexible tube 23 which is clamped by a clip 22. The other end of the flexible tube is clamped on to a respective connection piece 21 of a rotating disc 25 to which reference will be made hereinafter. The branch or vertical part 21c of the connection piece 21 opens lowerly on the inside of the sucker 26, which is constructed of elastic material and is fixed to the connection piece 21. The other branch or part 21d of the connection piece 21 aligned with the part 21b is normally closed by the cap 27. This cap is fixed to the lower end of a vertical pin 28 which is rotatably supported by a projection of the clamp 21a and with which is upperly rigid the lever 29 provided with the roller 30 rotatable about a vertical axis. Between the clamp 21a and the pin 28 is interposed a spring, not shown in the figure, which retains the cap 27 in the position of closure of the branch 21d of the connection piece 21. The cap is moved to the open position when, as will be seen hereinafter, a cam which is stationary along the path of the chains 7 acts on the roller 30. At the top of the rod 18 is clamped the clamp 31 on which the roller 32 is mounted rotatable about a horizontal axis. The rollers 32 of the rods 18 come into engagement with straight stationary cams 33 and 34 rigid with the frame 12 by means of brackets 35, and which extend parallel to those portions of the chains 7 lying between the rotating assemblies 9, 10 and 10, 11 respectively. The cams 33, 34 comprise an intermediate horizontal portion the end parts of which point upwards.

The disc 25, at the periphery of which are regularly distributed the connection pieces 24 for the various flexible tubes 23, is mounted rotatably on the vertical pin 36 fixed to the upright 37 of the frame 12. With the disc 25 is rigid the ring gear 38 around which winds a chain which has not been shown and which also winds on the sprocket 14. The transmission between the sprocket 14 and gearwheel 38 is such that as the chains 7 move through their entire length, the disc 25 makes one complete revolution. Under the disc 25 is the plate 39 fixed to the upright 37 and provided peripherally, at the trajectory travelled by the connection pieces 24, with a through slot of aperture 40, in the form of an arc of a circle. The slot 40 corresponds to the upper aperture of a manifold 41 fixed to the lower face of the disc 25 and divided into sectors by vertical diaphragms 42, disposed in the radial direction. At each of these sectors a relative pipe stub 43 descends from the bottom of the manifold 41, and to this is connected the inlet, not shown, of a respective exhauster. The disc 25 and hence also the wheel 38 fixed to it, and which as said rotates about the pin 36, can carry out small axial movements along the pin 36 itself. The disc 25 seals against the plate 39 by being thrust against it by the spring 44, which remains interposed between the wheel 38 and the thrust plate 45. This thrust plate is mounted rotatably by way of the thrust bearing 46 which rests on an elastic ring disposed at the end of the pin 36. Before illustrating the operation of the apparatus, it should be first noted that the shaft 13 drives the chain 7 with constant speed in the direction indicated by the arrow C in FIG. 1. This speed is different and, for example, greater than that of the belt 1. Furthermore, considering a fixed line transverse to the belt, in one unit of time the number of objects 5 which cross this line is equal or perhaps slightly greater than the number of suckers 26. The objects 5 proceed on the belt 1 in irregular succession, i.e. without being uniformly spaced apart. If the objects are of convex shape as shown in FIG. 1, 3a and 3b, it is permissible for two or more objects 5 to be located one immediately behind the other. The suckers 26 will still manage to space one object from the other. If however the objects are of square shape, as shown in FIGS. 4 and 5, it is preferably for them to proceed spaced apart on the belt 1 so that between two successive objects there is a space at least equal to the diameter of one of the suckers 26. In this case, in order to positively space the objects 5 on the belt 1, a feed unit is provided consisting of a belt 47, which moves at a speed slightly less than that of the belt 1, a set of idly mounted rollers 48 being interposed between the two belts.

As the suckers 26 travel with and above the belt 1, the rollers 32 of their rods 18 engage with the cam 33, which because of its particular shape causes the rods 18 to descend. Along the portion 33a of the cam, the suckers thus find themselves on a trajectory close to that which the objects 5 take, as they are dragged by the belt 1. Because of the difference in speed between the chains 7 and belt 1 in this lowered position each sucker scans a certain portion of the belt 1, and when it arrives above an object 5 this latter adheres to the sucker, which is activated because the connection piece 24 of its tube 23 is connected to the manifold 41 by way of the slot 40. If the objects 5 are not excessively heavy (FIG. 3b), the suction action of the sucker causes it to adhere to the object below it, and which rises immediately from the belt 1. If however the object 5 is of a certain weight, the sucker will adhere to it but in this case the suction action causes the sucker to descend on to the object, the weight of which on the belt is however reduced by the extend of the force with which the spring 20 is loaded when the sucker is in its maximum descent position. It should be noted (FIG. 3b) that at its lowest portion 33a which extends parallel to the belt 1, the cam 33 acts only from above on the rollers 32 of the rods, leaving them free of descend a greater distance than that determined by the cam itself. If the objects 5 have a rather large upper face, an assembly (FIG. 6) of two or more suckers 26 is associated with one rod 18. The adherence of the object to the sucker assembly will take place when all the suckers of the assembly have arrived above the object. If the flow of objects 5 on the belt 1 does not deviate excessively from the average, one object will become associated with each sucker (or group of suckers), because of which the various objects assume a mutual distance apart which is equal to the distance between the suckers. Moreover they are in phase with the chains 7. When the suckers dragged by the chains 7 are about to leave the belt 1, their rods 18 engage with the end part 33b of the cam 33, which enables the rods 18 to reacquire their raised position, raising with them also the objects taken from the belt 1. If any of the objects 5 should remain on the belt 1, the immediately successive object adhering to a sucker would push it to the exit of the belt 1 so that it falls into the container 49, the inlet of which remains between the exit of the belt 1 and the inlet of the belt 2. It should be noted that the division of the manifold 42 into sectors, each of which sucks independently, means that if one sucker 26 does not pick up this does not prejudice the sucking action of the other suckers. Having left the belt 1, the suckers move on to the belt 2. The intermittent movement of this latter belt is controlled such that as the suckers 26 advance by one step, the belt 2 advances by one compartment, one step of the belt 2 being less than one step of the suckers. As the rods 18 are about to arrive above the belt 2, their rollers 32 engage with the cam 34, which causes the rods to descend towards the compartments of the belt. When the object 5, carried by a sucker 26, is about to penetrate into the corresponding compartment of the belt 2, it reaches a speed equal to the speed of movement of the chains 7. The object is released into the compartment because the connection between the relative tube 23 and the manifold 42 ceases, and at the same time the stationary cam acts on the roller 30 of the relative cap 27 causing it to open and immediately connecting the connection piece 21 to atmosphere. The release of the object thus takes place regularly without any relative movement between the object and the compartment; however small misalignments which may occur between the object and the sucker at the moment of takeup are corrected by the settling of the object in the compartment. Subsequently the rod 18 which has abandoned the object leaves the cam 34 and rises again. The belt 2 however decelerates, and then again accelerates until it reaches an almost constant speed in order to receive a new object. Obviously if the objects 5 are of a certain weight, there will be no discontinuity between the cam 33 and the cam 34.

The belt 2 then conducts the objects 5 to their utilisation stage, for example to a wrapping machine, with which it is in phase and of which it follows the cycle. Although, under the aforementioned conditions, it would be expected that none of the compartments of the belt 2 would arrive at the utilisation stage without the relative object 5 (this would obviously signify that some of the suckers are not managing to take their respective object from the belt 1), the wrapping machine would itself be arranged to detect the absence of an object and to proceed correspondingly empty without this having any effect on the other operations under way. With reference to FIG. 5a, it will now be considered what minimum length D must the portion 33a of the cam 33 have which is parallel to the belt 1 and which keeps the suckers lowered, in order to enable objects 5 on the belt 1 to be picked up. It will be supposed that the chains 7 are driven at a greater speed than the belt 1 and that N is the portion through which the said belt advances as the suckers 26 advance through a step V. Then if at the moment in which a sucker 26a is at the beginning of the portion 33a, an object 5a is behind it only by the minimum distance E which does not permit it to be sucked, the condition which D has to satisfy is that of allowing the sucker 26b immediately following the sucker 26a to reach and suck the said object 5a at the end of the portion 33a. On this basis the speed of the suckers is $v_7 = V/t$ and the speed of the objects is $v_5 = N/t$.

Taking as the fixed reference point the point in which the sucker 26b is at a distance of one step V from the beginning of the cam 33a, the path travelled by the sucker 26b, measured at the moment in which it arrives above the object 5a, is $x = V_7 \cdot t$. At the same time the path travelled by the object 5a is $x = R = v_5 \cdot t$, with $x > R$, where R is the difference between V and E. Eliminating the time t in the two stated equations, this gives $x = v_7 \cdot R/(v_7 - v_5)$. As the sucker 26b must reach the object before the end of the cam 33a, the path x travelled by the sucker 26b at the moment in which this latter reaches the object 5a must satisfy the condition $x = D + V$.

Substituting x by the first expression, this gives
$$x = v_7 \cdot R/(v_7 - v_5) \leq D + V.$$
As $v_7 = V/t$ and $v_5 = N/t$, this gives $D \geq (R/V-N)-1)V$. The minimum length of the cam 33a must hence by $D = (R/V-N) - 1)V$.

With reference to FIG. 5b, the case will now be considered in which the chains 7 have a lower speed that the belt 1. Indicating again by N the portion by which the belt advances for the advancement of a step v of the suckers 26, if at the beginning of the portion 33a the sucker 26a is behind an object 5a by only the distance E, the same object, not managing to be sucked by the said sucker, must at the end of the portion 33a reach the sucker 26c, which immediately precedes the sucker 26a, in order to be sucked by it. If the difference between V and E is again R, then by analogous reasoning to the preceding, the minimum length of the portion 33a is
$$D = (R/N-V + 1) V.$$
It should be noted that the apparatus according to the invention, contrary to other known devices of the same category, encounters no obstacle to its operation if the flow of objects 5 on the belt 1 is greater than that on the belt 2. The objects which are in excess on the belt 1 are simply discarded into the container 49. Under this condition, as already stated, there is the maximum guarantee that all the compartments of the belt 2 arrive at the packaging machine full of respective objects 5.

There has thus been described a preferred embodiment of an apparatus and method for transferring unevenly spaced delicate articles from a feed conveyor to a reception conveyor where the articles are deposited in a predetermined spacing arrangement in accordance with the present invention. It should be understood by those skilled in the art that various changes and omissions in the form and detail thereof may be made therein without departing from the spirit and scope of the invention, which is to be limited only as set forth in the following claims:

What I claim as new and desire to secure by Letters Patent of the United States is:

1. An apparatus for arranging, at a predetermined spacing on a reception conveyor, objects originating in an unevenly spaced manner from a delivery conveyor, in which the delivery conveyor is driven with continuous motion whereas the reception conveyor is driven with intermittent motion, and comprising a flexible closed loop member lying in a horizontal plane, of which a first portion extends parallel to the end part of the delivery conveyor and a second portion extends parallel to the initial part of the reception conveyor, a series of suckers distributed along said flexible member and mobile vertically by means of cams disposed along said first and second portions for causing the suckers to move close to the delivery and reception conveyors and a distributor member arranged to connect and disconnect the suckers cyclically to and from suction means for taking the objects from the delivery conveyor and depositing them respectively on the reception conveyor, the speed of said flexible member being constant and different from that of the delivery conveyor, and the reception conveyor during the intermittent advancement stroke being arranged to attain a speed equal and concordant with that of the flexible member.

2. An apparatus as claimed in claim 1, in which said suckers are rigid with the lower ends of rods guided vertically in seats rigid with the flexible member and subjected to the action of respective springs which maintain them in a rest position above the trajectory travelled by the objects disposed on the delivery and reception conveyors, said rods being controlled by straight stationary cams extending parallel to the portions of said flexible member parallel to the delivery and reception conveyors.

3. An apparatus as claimed in claim 2, in which the suckers are fixed to the lower ends of the rods by way of respective T connection pieces, a tubular part of which opens in the suckers, a second tubular part is connected by way of a flexible tube to the distributor member and finally a third tubular part is closed by a cap which is caused to open by a stationary cam at the inlet of the reception conveyor for the release of the held product on to said reception conveyor on the deactivation of the relative sucker.

4. An apparatus as claimed in claim 1, in which said distributor member comprises a rotating disc provided with connectors for the flexible tubes connected to the suckers and thrust by elastic means on to a fixed plate provided with an aperture extending in the form of an arc of a circle concentric to the axis of rotation of said disc and constituting the mouth of a manifold divided into sectors by diaphragms 42, each of which is connected to relative exhaust means.

5. An apparatus as claimed in claim 1, in which the flow of objects conveyed by the delivery conveyor is on the average greater than the flow of suckers supported by said flexible member and between the exit of the delivery conveyor and the inlet of the reception conveyor there is a space for the discharge of objects not taken up by the suckers.

6. An apparatus as claimed in claim 1 in which said reception conveyor extends perpendicular to said delivery conveyor at its end, and said flexible member extends along a triangular path with two sides parallel to the terminal and initial portion of said delivery conveyor and reception conveyor respectively.

7. A method for arranging objects on a reception conveyor in a predetermined spacing arrangement, which objects originate in an unevenly spaced manner on a delivery conveyor which is disposed at an angle with respect to said reception conveyor comprising:
   placing objects on a delivery conveyor in an unevenly spaced manner;
   operating said delivery conveyor at a substantially constant speed;
   disposing a series of vertically and horizontally movable suckers above said delivery conveyor and said reception conveyor;
   moving said suckers in a horizontal path at a constant speed which is different from the speef of said delivery conveyor, said path having a first portion parallel to said delivery conveyor and a second portion parallel to said reception conveyor;
   moving said suckers downwardly and parallel to said delivery conveyor and picking up said objects from said delivery conveyor and moving said suckers upwardly after said suckers have picked up said objects;
   subsequently moving said suckers downwardly and parallel to said reception conveyor and depositing said objects on said reception conveyor in a predetermined spacing arrangement;
   operating said reception conveyor intermittently, and during operation, to attain a speed substantially equal to the speed of said suckers along said second portion of said horizontal path while the objects are being deposited thereon; and
   moving said suckers upwardly after said suckers have deposited said objects.

8. A method as defined in claim 7 wherein said suckers are moved in a horizontal path at a constant speed which is greater than the speed at which said delivery conveyor is operated.

* * * * *

PO-1050
(5/69)

UNITED STATES PATENT OFFICE
CERTIFICATE OF CORRECTION

Patent No. 3,990,569          Dated November 9, 1976

Inventor(s) Franco Aiuola

It is certified that error appears in the above-identified patent and that said Letters Patent are hereby corrected as shown below:

Line 4 of the Title should read --ORIGINATING IN AN UNEVENLY SPACED--

Col. 1, line 3 of the Title, "A" should read --AN--

Col. 1, line 4 of the Title, should read --UNEVENLY SPACED MANNER FROM A DELIVERY--

Col. 1, line 52, after "taking" insert --the--

Col. 1, line 52, delete "the"

Col. 2, line 37, "idle rollers" should read --idle roller--

Col. 3, line 53, "of" first occurrence should read --or--

Col. 4, line 16, "preferably" should read --preferable--

Col. 4, line 49, "of" second occurrence should read --to--

Col. 8, line 20, "speef" should read --speed--

Signed and Sealed this

First Day of February 1977

[SEAL]

Attest:

RUTH C. MASON
*Attesting Officer*

C. MARSHALL DANN
*Commissioner of Patents and Trademarks*